United States Patent [19]

Miyoshi et al.

[11] Patent Number: 4,592,952
[45] Date of Patent: Jun. 3, 1986

[54] MAGNETIC RECORDING MEDIUM

[75] Inventors: Takahito Miyoshi, Odawara; Toshimitu Okutu; Masaaki Fujiyama, both of Minami-ashigara, all of Japan

[73] Assignee: Fuji Photo Film Co., Ltd., Kanagawa, Japan

[21] Appl. No.: 536,008

[22] Filed: Sep. 26, 1983

[30] Foreign Application Priority Data

Sep. 27, 1982 [JP] Japan ................................ 57-166662

[51] Int. Cl.⁴ ............................................. G11B 5/70
[52] U.S. Cl. .................................... 428/323; 360/134; 360/135; 360/136; 427/128; 427/131; 428/329; 428/333; 428/694; 428/900; 428/337
[58] Field of Search ........................ 427/131, 132, 128; 428/900, 694, 695, 336, 323, 329, 408; 360/134–136

[56] References Cited

U.S. PATENT DOCUMENTS

| | | | |
|---|---|---|---|
| 4,189,514 | 2/1980 | Johnson | 428/900 |
| 4,310,599 | 1/1982 | Akashi et al. | 428/413 |
| 4,388,360 | 6/1983 | Miyoshi et al. | 428/695 |
| 4,414,270 | 11/1983 | Miyoshi et al. | 428/325 |
| 4,419,406 | 12/1983 | Isobe et al. | 428/422 |

Primary Examiner—Ellis P. Robinson
Attorney, Agent, or Firm—Burns, Doane, Swecker & Mathis

[57] ABSTRACT

A magnetic recording medium comprising a non-magnetic support, a magnetic layer on a surface of the non-magnetic support, and a backing layer on a reverse surface of the non-magnetic support, composed of powder and a binder, and having a thickness of not more that 2 microns, wherein said powder comprises TiO$_2$ powder and carbon black powder in the weight ratio of 4:6 to 10:0. The average particle size of TiO$_2$ powder ranges from 0.01 to 0.8 microns.

7 Claims, 1 Drawing Figure

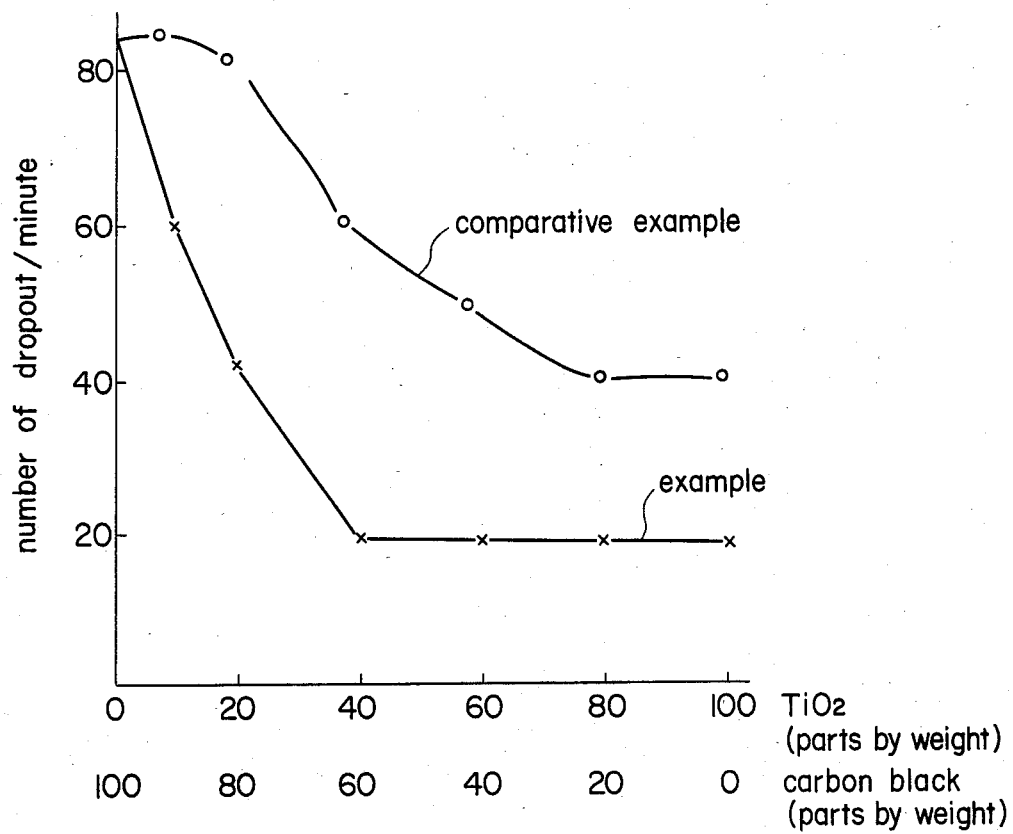

MAGNETIC RECORDING MEDIUM

BACKGROUND

The present invention relates to a magnetic recording medium, in particular to a magnetic recording medium having an improved backing layer which is coated onto a side of a support opposite to a magnetic layer which is coated to the support.

In general, the magnetic recording medium such as magnetic tape for a video tape recorder comprises a support, a magnetic layer (or a magnetic recording layer) and a backing layer on the opposite sides of the support, forming a thin tape so as to enable high density recording.

Conventional magnetic thin tapes having a smooth finished surface to provide improved electromagnetic properties such as signal-to-noise ratio cannot be uniformly and orderly wound or rewound, so that tension variations during such winding or rewinding reduce its running properties and cause unstable output. In addition, the tape may be easily distorted or damaged.

In order to overcome the aforementioned defects, a surface of the backing layer has been roughened with minute concaves and convexes so as to provide better running properties and running durability. However, these magnetic recording media having such an improved backing layer, particularly in the case of magnetic tape, have such a defect that the concaves and convexes of the backing layer are transferred to the surface of the surface of the adjacent magnetic layer when the magnetic recording medium is taken up in roll or stacked in sheet, thereby impairing electromagnetic properties, in particular decreased signal-to-noise ratio. In other words, it is difficult for conventional magnetic recording media to fulfill both the requirements of electromagnetic properties and running properties simultaneously.

For example, wear, increase in coefficient of friction, and breaking of tape tend to occur in the backing layer of the conventional magnetic recording medium. Also the conventional magnetic recording medium is easily electrostatically charged due to high surface resistivity, which causes depositing of dusts and flake-offs onto the magnetic recording medium and the consequent frequent dropoff.

SUMMARY OF THE INVENTION

Accordingly, it is an object of the present invention to provide a novel magnetic recording medium having a backing layer with its running properties improved without impairing the electromagnetic properties of a magnetic layer, in particular signal-to-noise ratio.

It is another object of the present invention to provide a novel magnetic recording medium having a backing layer with no increased coefficient of friction and excellent running durability.

Still further objects of the present invention will become apparent in the following disclosure.

BRIEF DESCRIPTION OF THE DRAWING

The single FIGURE is a graph showing the number of dropouts in response to a change in the weight ratio of $TiO_2$ to carbon black. Curve 1 shows an embodiment in accordance with the present invention and Curve 2 a reference example.

The drawing is presented for better illustration of the embodiments and not for the limitative purpose. Modifications may be made by those skilled in the art without departing from the concept of the present invention.

DETAILED DESCRIPTION OF THE PREFERRED EMBODIMENTS

The magnetic recording medium according to the present invention comprises a magnetic layer on a surface of a non-magnetic support and a backing layer with a thickness of not more than 2 microns on the other surface of the non-magnetic support wherein the backing layer comprises powder and a binder, the powder comprising 1:9 to 10:0 by weight ratio of $TiO_2$ powder to carbon black powder. The preferable average particle size of titanium oxide ($TiO_2$) ranges from 0.01 to 0.8 microns, more preferably from 0.06 to 0.4 microns. The average particle size of carbon black is preferably in the range of 15 to 200 millimicrons, more preferably in the range of 20 to 150 millimicrons. When carbon black in this range is used together with $TiO_2$ in the backing layer, the thus obtained magnetic recording medium shows reduced dropout.

Excellent antistatic effects are obtainable with the magnetic recording medium of the present invention because $TiO_2$ powder and carbon black powder are both electrically conductive. Furthermore running properties of the magnetic recording medium are improved because minute concaves and convexes are formed on the surface of the backing layer due to the $TiO_2$ contained therein.

When $TiO_2$ powder and carbon black powder are contained in the backing layer in the ratio of 4:6 to 10:0, dropouts cannot occur frequently. (Refer to FIG. 1) Coefficient of friction is preferably low in the ratio of 4:6 to 6:4 of $TiO_2$ to carbon black, while when $TiO_2$ exceeds the amount in the above-mentioned ratio, coefficient of friction is somewhat increased. Signal-to-noise ratio is remarkably improved in the range where $TiO_2$ is contained in more than the ratio of 2:8 of $TiO_2$ to carbon black. Thus, the best effects are available in the ratio of 4:6 to 6:4 of $TiO_2$ to carbon black.

The reduced dropout obtained with the magnetic recording medium of the present invention is thought to be derived from improved running properties and running durability.

The backing layer of the magnetic recording medium of the present invention contains $TiO_2$ and carbon black at a given ratio as powdery constituents. Other inorganic powders may be contained as well. Such inorganic powders include graphite, tungsten disulfide, molybdenum disulfide, boron nitride, silicon dioxide, calcium carbonate, aluminum oxide, iron oxide, magnesium oxide, zinc oxide, calcium oxide, lithopone, talc etc. $TiO_2$ may be contained in the backing layer either in the form of pulverized powder of the simple substance or in the form of colloidal dispersion which is formed together with the above-mentioned inorganic powders or barium sulfate. The $TiO_2$ powder herein described, like other inorganic powders, refers not only to powder of $TiO_2$ per se but to powder coated with $TiO_2$.

In the case that inorganic powders other than $TiO_2$ and carbon black are used together with $TiO_2$ and carbon black as powdery constituents, the combined amount of $TiO_2$ and carbon black is preferably not less than 30 percent by weight of the total powder amount. It is preferable that the particle size range of other inorganic powders be approximately the same as that of $TiO_2$.

These powders, coated on the opposite side of the support by utilization of a binder in a given ratio, provide the magnetic recording medium with a rough surface suitable enough to show excellent running properties and running durability and also provide the backing layer with a good electric conductivity and prevent dust and flake-offs from depositing on the magnetic recording medium.

The binders for the backing layer of the present invention may be the binders conventionally used in the industry such as thermoplastic resins, thermosetting resins, reactive resins and mixtures thereof.

The thermoplastic resin encompasses vinyl chloride-vinyl acetate copolymer, vinyl chloride-vinylidene chloride copolymer, vinyl chloride-acrylonitrile copolymer, acrylic ester-acrylonitrile copolymer, acrylic ester-vinylidene chloride copolymer, acrylic ester-styrene copolymer, methacrylate ester-acrylonitrile copolymer, methacrylate ester-vinylidene chloride copolymer, methacrylate ester-styrene copolymer, urethane elastomer, polyvinyl fluoride, vinylidene chloride-acrylonitrile copolymer, butadiene-acrylonitrile copolymer, polyamide resin, polyvinylbutyral, cellulosic resins such as cellulose acetate butyrate, cellulose diacetate, cellulose propionate, nitrocellulose, styrene-butadiene copolymer, polyester resin, chlorovinylether-acrylic ester copolymer, amino resin, a variety of rubber-based resins, etc.

The thermosetting or reactive resin includes phenolic resin, epoxy resin, polyurethane thermosetting resin, urea resin, melamine resin, alkyd resin, acrylic reactive resin, polyisocyanate, polyamine, etc.

Of the above-mentioned, the three-component system comprising cellulosic resin, thermoplastic polyurethane elastomer and polyisocyanate is particularly preferable.

As cellulosic resins, cellulosics such as nitrocellulose are most suitable and contribute to give heat resistance, toughness and anti-block properties to the magnetic recording medium.

As the thermoplastic polyurethane elastomers, almost all commercially available products such as the following may be used: polyester polyurethane resins and polyether polyurethane resins obtained by treating polyester polyol obtained by the reaction between organic dibasic acids such as phthalic acid, adipic acid, dimerized linolenic acid and maleic acid, and either glycols such as ethylene glycol, propylene glycol, butylene glycol and diethylene glycol, or polyhydric alcohol such as trimethylolpropane, hexanetriol, glycerin, trimethylolethane and pentaerythritol, with polyisocyanate compounds such as tolylene diisocyanate, 4,4′-diphenylmethane diisocyanate, hexamethylene diisocyanate, m-xylylene diisocyanate, and the compound represented by the general formula (I) having a ring or rings of

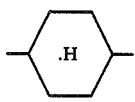

in its basic molecular structure

[(O—R—OOC—R′—CO)m—OROOCNH—R′'—NHCO—]   (I)

where m represents an integer of 5 to 100, and R represents a bivalent group introduced by alicyclic or aromatic compounds having at least two such groups as hydroxyalkyl group with 1 to 4 carbons and/or hydroxyalkoxyl group with 1 to 4 carbons, R′ represents

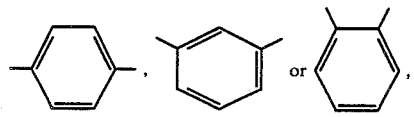

R″ represents

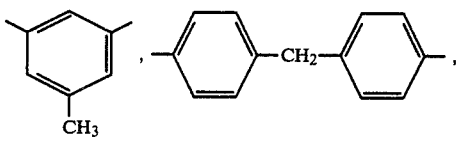

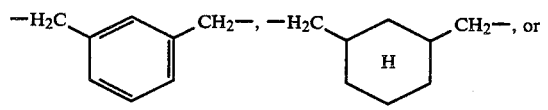

where n is an integer of 4 to 6.

The applicable range of molecular weight of these compounds is 5,000 to 500,000, preferably 10,000 to 200,000. These polyurethanes are described in Japanese Patent Kokai Openlaying No. 54-26880.

As polyisocyanates, 2,4-tolylene diisocyanate, 1,6-hexamethylene diisocyanate, tri-isocyanate, for example "Coronate L" manufactured by Nippon Polyurethane Industry Co., Ltd. may be used.

A binder composition is as follows: per 100 parts by weight of a binder, 20 to 80 parts by weight (30 to 60 parts by weight are particularly preferable) of cellulosic resin, 20 to 50 parts by weight (30 to 40 parts by weight are more preferable) of thermoplastic polyurethane elastomer, and 10 to 50 parts by weight (20 to 40 parts by weight are particularly preferable) of polyisocyanate.

The weight ratio of the powder such as inorganic and carbon black powders to the binder in the backing layer of the present invention is preferably in the range of 2.5:1 to 0.1:1. The range of 1.5:1 to 0.8:1 is particularly preferable.

In order to increase the recording density per unit volume, the thickness of the backing layer of the present invention is determined so that the total thickness of the magnetic recording medium comprising a magnetic layer, a support and a backing layer can be as thin as possible. The preferable thickness of the backing layer is from 0.3 to 2 microns, and the range of 0.5 to 1 micron is particularly preferable.

If the average surface roughness (Ra) of the backing layer is not more than 0.05 microns, preferably not more than 0.024 microns when measured at the center line of a cut-off of 0.08 mm, more beneficial results are available.

According to the present invention, the magnetic recording medium having the aforementioned properties is obtainable. Namely, while when the the conventional magnetic recording medium with a thin backing layer is run, the backing layer is broken, the magnetic recording medium of the present invention does not have such a defect. By utilization of the backing layer of the present invention, the video signal-to-noise ratio is not impaired even in high density recording in a wavelength of 1.3 microns.

The magnetic recording medium of the present invention may be prepared using the materials and process disclosed in Japanese Patent Kokai Openlaying No. 52-108804.

The present invention will be described by way of embodiments. However, the embodiments and examples are presented for better understanding of the invention but not for limitation thereof and any modifications apparent in the art would be made without departing from the concept and scope of the claims of the present invention. The word "part" used in the examples refers to "part by weight".

EXAMPLE

A sample of magnetic recording medium was prepared in the following manner:

A magnetic layer comprising γ-iron oxide containing cobalt and a packing layer are formed on the opposite sides of a support of polyethylene terephthalate having a thickness of 14 microns. The magnetic layer was coated on the support so that the thickness of the layer was 5 microns in a dried state. The backing layer was prepared in the following manner: 370 parts of the binder having the below-mentioned composition was mixed with and dispersed in 100 parts of inorganic powders to form a thickness of 0.8 microns in a dried state. As the inorganic powders, $TiO_2$ powder with an average particle size of 0.1 micron and carbon black powder with an average particle size of 100 to 120 millimicrons were mixed in the ratio as shown in the FIGURE.

| Binder Composition | |
|---|---|
| Vinyl chloride - vinyl acetate copolymer (400X-110A, manufactured by Nippon Zeon Co., Ltd.) | 30 (parts) |
| Polyurethane (Nippollan 2301, manufactured by Nippon Polyurethane Industry Co., Ltd.) | 15 |
| Polyisocyanate (Coronate L, manufactured by Nippon Polyurethane Industry Co., Ltd.) | 25 |
| Methyl ethyl ketone | 300 |

The following measurements were made on the sample magnetic recording medium thus obtained.

TESTS (1) Number of Dropout: The number of dropout of 15 micron seconds per one minute, which occurred from a 100-microns sample tape by using a VTR NV-8300 manufactured by Matsushita Electric Industrial Co., Ltd., was counted by means of a dropout counter, VD-3D manufactured by Victor Musical Industries Inc. The results obtained are shown in the attached FIGURE.

(2) Surface Roughness: Measured with a stylus type surface roughness tester. The average surface roughness (Ra) was not more than 0.05 microns when measured at the center line of a cut-off of 0.08 mm.

(3) Video sensitivity, sagging in winding, etc. as well were measured and more excellent results than those available with the conventional products were obtained.

COMPARATIVE

A magnetic tape was prepared by the same manner as in the Example except that talc powder was used in lieu of $TiO_2$ powder. Dropout was counted in the same manner as in the Example. The results obtained are shown in the attached FIGURE.

As hereinbefore described, according to the present invention, a magnetic recording medium with good running durability, less dropout numbers, excellent antistatic properties, and great signal-to-noise ratio is obtainable by containing $TiO_2$ powder and carbon black powder in a given ratio in the backing layer.

While the invention has been described in its preferred embodiments of the magnetic tape, it is obvious that the invention is not limited to the aforementioned examples, but is applicable to such magnetic recording media as magnetic card, and floppy disk.

We claim:

1. A magnetic recording medium comprising a non-magnetic support, a magnetic layer on a surface of the non-magnetic support, and a backing layer on a reverse surface of the non-magnetic support, said backing layer being composed of a powder and a binder and having a thickness of not more than 2 microns, wherein said powder comprises $TiO_2$ powder having an average particle size ranging from 0.01 to 0.8 microns and carbon black powder in the weight ratio of 4:6 to 6:4.

2. A magnetic recording medium defined in claim 1 wherein the average particle size of carbon black powder is in the range of 15 to 200 millimicrons.

3. A magnetic recording medium defined in claim 1 wherein $TiO_2$ and carbon black powders are not less than 30 percent by weight of total powdery amount in the backing layer.

4. A magnetic recording medium defined in claim 1 wherein the weight ratio of powder to the binder in the backing layer is in the range of 2.5:1 to 0.1:1.

5. A magnetic recording medium defined in claim 1 wherein the binder in the backing layer comprises cellulosic resin, thermoplastic polyurethane elastomer and polyisocyanate.

6. A magnetic recording medium defined in claim 1 wherein the average surface roughness (Ra) of the backing layer, when measured at the center line of a cut-off of 0.08 mm, is not more than 0.05 microns.

7. A magnetic recording medium defined in claim 8 wherein the average surface (Ra) of the backing layer is not more than 0.024 microns.

* * * * *